United States Patent
Kim et al.

(10) Patent No.: US 12,542,284 B2
(45) Date of Patent: Feb. 3, 2026

(54) STEEL SHEET HAVING EXCELLENT HYDROPHILICITY AND CONDUCTIVITY

(71) Applicant: POSCO Co., Ltd, Pohang-si (KR)

(72) Inventors: Jonghee Kim, Daejeon (KR); Jieon Park, Pohang-si (KR); Kwangmin Kim, Pohang-si (KR); Bosung Seo, Pohang-si (KR); Jinsuk Kim, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 153 days.

(21) Appl. No.: 18/285,568

(22) PCT Filed: May 26, 2022

(86) PCT No.: PCT/KR2022/007507
§ 371 (c)(1),
(2) Date: Oct. 4, 2023

(87) PCT Pub. No.: WO2022/255731
PCT Pub. Date: Dec. 8, 2022

(65) Prior Publication Data
US 2024/0204213 A1    Jun. 20, 2024

(30) Foreign Application Priority Data
May 31, 2021    (KR) .................. 10-2021-0069653

(51) Int. Cl.
*H01M 8/021*    (2016.01)
*B21B 45/08*    (2006.01)
(Continued)

(52) U.S. Cl.
CPC ............ *H01M 8/021* (2013.01); *B21B 45/08* (2013.01); *C21D 8/0205* (2013.01);
(Continued)

(58) Field of Classification Search
None
See application file for complete search history.

(56) References Cited

U.S. PATENT DOCUMENTS 9,531,014 B2 * 12/2016 Nagoshi .................. C22C 38/02
2010/0248072 A1    9/2010 Shida et al.
(Continued)

FOREIGN PATENT DOCUMENTS

EP    2770567 A1    8/2014
EP    3576199 A1    12/2019
(Continued)

OTHER PUBLICATIONS

International Search Report dated Aug. 30, 2022 issued in International Patent Application No. PCT/KR2022/007507 (with English translation).
(Continued)

*Primary Examiner* — Daniel J. Schleis
(74) *Attorney, Agent, or Firm* — Morgan Lewis & Bockius LLP (57) ABSTRACT

Disclosed is a steel sheet having excellent hydrophilicity and conductivity. The steel sheet having excellent hydrophilicity and conductivity according to an embodiment may include a joint structure on the steel sheet, wherein the joint structure includes microprotrusions having inter-pitch intervals of 1 to 500 nm in an area fraction of 20% or more.

11 Claims, 3 Drawing Sheets

(51) Int. Cl.
  *C21D 8/02* (2006.01)
  *C21D 9/46* (2006.01)
(52) U.S. Cl.
  CPC ......... *C21D 8/0226* (2013.01); *C21D 8/0236* (2013.01); *C21D 8/0263* (2013.01); *C21D 8/0278* (2013.01); *C21D 9/46* (2013.01)

(56) References Cited

U.S. PATENT DOCUMENTS

2012/0181346 A1  7/2012  Greer et al.
2016/0305011 A1  10/2016  Wang et al.

FOREIGN PATENT DOCUMENTS

| EP | 3916136 A1 | 12/2021 |
| EP | 4302890 A1 | 1/2024 |
| JP | 2003-132904 A | 5/2003 |
| JP | 3614496 B2 | 11/2004 |
| JP | 2006-040608 A | 2/2006 |
| JP | 2009-221607 A | 10/2009 |
| JP | 2019-502816 A | 1/2019 |
| JP | 2023-087304 A | 6/2023 |
| KR | 10-2011-0085003 A | 7/2011 |
| KR | 10-2014-0088886 A | 7/2014 |
| KR | 10-2015-0075754 A | 7/2015 |
| KR | 10-2017-0101528 A | 9/2017 |
| KR | 10-2019-0127968 A | 11/2019 |
| KR | 10-2020-0124309 A | 11/2020 |
| KR | 10-2326257 B1 | 11/2021 |
| WO | 2013/080533 A1 | 6/2013 |
| WO | 2018/198685 A1 | 11/2018 |
| WO | 2020/153117 A1 | 7/2020 |

OTHER PUBLICATIONS

Korean Notice of Allowance dated Oct. 8, 2021 issued in Korean Patent Application No. 10-2021-0069663.
Korean Office Action dated Jul. 26, 2021 issued in Korean Patent Application No. 10-2021-0069663.
Adesina et al., "Post-annealing effect on the electrochemical behavior of nanostructured magnetron sputtered W3O films in chloride- and acid-containing environments", Surface & Coatings Technology, vol. 420, 2021, pp. 1-13.
Fan et al., "A sustainable dynamic redox reaction passive film for long-term anti-corrosion of carbon steel surface", Journal of Colloid and Interface Science, vol. 580, 2020, pp. 146-159.
Hirano et al., "Fabrication of antibacterial nanopillar surface on AISI 316 stainless steel through argon plasma etching with direct current discharge", Surface & Coatings Technology, vol. 406, 2021, pp. 1-8.
Hirano et al., "Variation in nanopillar surface on plasma-etched stainless steel owing to the crystal phase and composition", Materials Chemistry and Physics, vol. 272, 2021, pp. 1-7.
Mills et al., "Silicon nanopillar anodes for lithium-ion batteries using nanoimprint lithography with flexible molds", J. Vac. Sci. Technol. B, vol. 32, No. 6, Nov./Dec. 2014, pp. 06FG10-1-06FG10-5.
Nakasa et al., "Nano-Indentation Characteristics of Surface Layer with Fine Conical Protrusions Formed by Sputter Etching of W-Cr Tool Steel", J. Japan Inst. Metals, vol. 73, No. 11, 2009, pp. 870-877.
Nakasa et al., "Effect of plasma nitriding on the compressive strength of multi-functional fine protrusions formed by sputter-etching of stainless steels", The Japan Society of Mechanical Engineers, 2016, 15 pages.
Nakasa et al., "Superhydrophobicity produced by vapor deposition of a hydrophobic layer onto fine protrusions formed by sputter-etching of steels", Surface & Coatings Technology, vol. 210, 2012, pp. 113-121.
Narayanasamy et al., "Influence of pulse reverse current on mechanical and corrosion resistance properties of Ni—MoSe2 nanocomposite coatings", Applied Surface Science, vol. 493, 2019, pp. 225-230.
Xu et al., "Self-Supported CoP Nanorod Arrays Grafted on Stainless Steel as an Advanced Integrated Anode for Stable and Long-Life Lithiu••Ion Batteries", Chem. Eur. J., vol. 23, 2017, pp. 5198-5204.
Extended European Search Report dated Nov. 29, 2024, issued in corresponding European Patent Application No. 22816390.3.
Office Action dated Oct. 29, 2024, issued in corresponding Japanese Patent Application No. 2023-569767 with an English translation.
The Partial Supplementary European Search Report date Jul. 18, 2024 issued in European Patent Application No. 22816390.3.
Office Action dated Apr. 22, 2025 issued in corresponding Japanese Patent Application No. 2023-569767 with the English translation. (Note: WO 2013/080533 A1 already submitted.).

* cited by examiner

STEEL SHEET HAVING EXCELLENT HYDROPHILICITY AND CONDUCTIVITY

CROSS-REFERENCE OF RELATED APPLICATIONS

This application is the U.S. National Phase under 35 U.S.C. § 371 of International Patent Application No. PCT/KR2022/007507, filed on May 26, 2022 which claims priority to and the benefit of Korean Application No. 10-2021-069653 filed on May 31, 2021, the entire contents of which are incorporated herein by reference.

TECHNICAL FIELD

The present disclosure relates to a steel sheet having excellent hydrophilicity and conductivity, and more particularly, to a steel sheet having excellent hydrophilicity and conductivity and available as a fuel cell separator.

BACKGROUND ART

Fuel cells are highly efficient eco-friendly batteries that directly convert chemical energy generated by chemical reaction between hydrogen and oxygen into electric energy. A fuel cell has a unit cell structure in which a gas diffusion layer and a separator are stacked on both sides of a membrane electrode assembly (MEA) including an electrolyte, an anode, and a cathode, and a structure in which a plurality of unit cells are connected in series is called a fuel cell stack.

A separator is provided with flow paths to supply a fuel (hydrogen or reformed gas) and an oxidant (oxygen and air) respectively toward electrodes of a fuel cell and to discharge water that is a product of electrochemical reaction. The separator performs a function in mechanically supporting the MEA and the gas diffusion layer and a function in electrical connection with adjacent unit cells.

Conventionally, a graphite material was used as a material of separators, stainless steels have been applied thereto in consideration of manufacturing costs, weight, and the like. These stainless steel materials should have excellent corrosion resistance in strongly acidic operating environments of fuel cells and stainless steels with excellent corrosion resistance and conductivity should be used therefor in terms of light weight, miniaturization, and mass production.

However, because resistance loss may occur in fuel cell performance in the case of using a conventional stainless steel that has a high resistance due to a passivated layer, a process of additionally coating a conductive material such as gold (Au), carbon, and nitride has been proposed. However, such methods described above have a problem of low productivity because manufacturing costs and manufacturing time increase due to the additional process of coating with a noble material or a coating material.

RELATED ART DOCUMENT (Patent Document 1) Korean Patent Publication No. 10-0836480 (Published on Jun. 9, 2008)

DISCLOSURE

Technical Problem

To solve the problem as described above, provided is a steel sheet having excellent hydrophilicity and conductivity and available as a fuel cell separator.

Technical Solution

In accordance with an aspect of the present disclosure to achieve the above-described objects, a steel sheet having excellent hydrophilicity and conductivity includes a joint structure on the steel sheet, wherein the joint structure includes microprotrusions having inter-pitch intervals of 1 to 500 nm in an area fraction of 20% or more.

In the steel sheet having excellent hydrophilicity and conductivity, among the microprotrusions, prismatic microprotrusions may be included in an area fraction of 20% or more, wherein the prismatic microprotrusions are microprotrusions in which three different polygonal faces with the same area or different areas share one vertex, an angle between normal vectors of the faces is more than 0° but less than 180°, and an area of a largest face among the three different faces sharing one vertex is less than 40,000 $nm^2$, and a sum of the areas of the three faces is less than 60,000 $nm^2$.

In the steel sheet having excellent hydrophilicity and conductivity, among the microprotrusions, rod-shaped microprotrusions may be included in an area fraction of 20% or more, wherein the rod-shaped microprotrusions are microprotrusions in the form of rods, each including a circular or polygonal base and a lateral face(s) vertically extending from the circular or polygonal base, an angle between a normal vector of the base and a normal vector of a surface of the steel sheet is from 0 to 90°, and a height of the lateral face is 50 nm or more.

In the steel sheet having excellent hydrophilicity and conductivity, the angle between the normal vector of the base and the normal vector of the surface of the steel sheet may be from 0 to 30°.

In the steel sheet having excellent hydrophilicity and conductivity, among the microprotrusions, needle-shaped microprotrusions may be included in an area fraction of 20% or more, wherein the needle-shaped microprotrusions are three-dimensional figures each including a curve or straight line continuously extending in a radial form from one vertex toward the steel sheet, wherein an angle between the radially extending curve or straight line and a normal vector of a surface of a steel sheet is more than 90° but not more than 180°, and a vertical distance from the vertex to the surface of the steel sheet is 50 nm or more.

In the steel sheet having excellent hydrophilicity and conductivity, the angle between the radially extending curve or straight line and the normal vector of the surface of the steel sheet may be from 150 to 180°.

In the steel sheet having excellent hydrophilicity and conductivity, crystal grains may have a size of 1 to 35 μm.

In the steel sheet having excellent hydrophilicity and conductivity, a height difference between crystal grains may be from 0.1 to 1000 nm.

Advantageous Effects

According to an embodiment of the present disclosure, a steel sheet having excellent hydrophilicity and conductivity and available as a fuel cell separator by including a joint structure may be provided.

BEST MODE

A steel sheet having excellent hydrophilicity and conductivity according to an embodiment of the present disclosure may include a joint structure on the steel sheet, wherein the joint structure includes microprotrusions having inter-pitch intervals of 1 to 500 nm in an area fraction of 20% or more.

Modes of the Invention

Hereinafter, embodiments of the present disclosure will be described in detail. The embodiments of the present disclosure may, however, be embodied in many different forms and should not be construed as being limited to the embodiments set forth herein. Rather, these embodiments are provided so that this disclosure will be thorough and complete, and will fully convey the concept of the invention to those skilled in the art.

Also, the terms used herein are merely used to describe particular embodiments. An expression used in the singular encompasses the expression of the plural, unless otherwise indicated. Throughout the specification, the terms such as "including" or "having" are intended to indicate the existence of features, operations, functions, components, or combinations thereof disclosed in the specification, and are not intended to preclude the possibility that one or more other features, operations, functions, components, or combinations thereof may exist or may be added.

Meanwhile, unless otherwise defined, all terms used herein have the same meaning as commonly understood by one of ordinary skill in the art to which this disclosure belongs. Thus, these terms should not be interpreted in an idealized or overly formal sense unless expressly so defined herein. As used herein, the singular forms are intended to include the plural forms as well, unless the context clearly indicates otherwise.

The terms "about", "substantially", etc. used throughout the specification means that when a natural manufacturing and a substance allowable error are suggested, such an allowable error corresponds the value or is similar to the value, and such values are intended for the sake of clear understanding of the present disclosure or to prevent an unconscious infringer from illegally using the present disclosure.

As a result of repeated experiments performed under various conditions to solve these problems, the present inventors have found that hydrophilicity and conductivity of steel materials are significantly improved in the presence of a joint structure on a steel sheet.

The "joint structure" refers to a structure in which microprotrusions having inter-pitch intervals of 1 to 500 nm are continuously distributed. In this regard, "inter-pitch interval" refers to an interval between the highest points of adjacent microprotrusions in a cross-section in a thickness direction.

It should be noted that the expression "on the steel sheet" refers to a positional relationship of being on the steel sheet and does not exclude other positional relationships of the steel sheet unless otherwise stated. According to an embodiment, this expression includes positional relationship of the steel sheet, a joint structure on the steel sheet, and an oxide layer on the joint structure.

The steel sheet according to an embodiment may include a joint structure formed thereon, wherein the joint structure includes microprotrusions having inter-pitch intervals of 1 to 500 nm in an area fraction of 20% or more. In the case where the microprotrusions are included in an area fraction less than 20%, sufficient hydrophilicity and conductivity cannot be obtained, so that the steel sheet may not be suitable for fuel cell separators. A steel sheet according to a preferred embodiment may include a joint structure including the microprotrusions in an area fraction of 30% or more. A steel sheet according to a more preferred embodiment may include a joint structure including the microprotrusions in an area fraction of 50% or more.

According to an embodiment, the microprotrusions have at least one shape selected from a prismatic shape, a rod shape, and a needle shape.

The "prismatic shape" refers to a figure in which three different polygonal faces with the same area or different areas share one vertex and an angle between normal vectors of the faces is more than 0° but less than 180°. Representative examples of the "prismatic shape" may be cuboids and cubes viewed from one vertex.

According to an embodiment of the prismatic microprotrusions, an area of the largest face among three different faces sharing one vertex may be less than 40,000 $nm^2$, and a sum of the areas of the three faces may be less than 60,000 $nm^2$. In the case where the area of the largest face is not less than 40,000 $nm^2$, or the sum of the areas of the three faces is not less than 60,000 $nm^2$, the prismatic microprotrusions excessively coarsen and thus hydrophilicity and conductivity may not be sufficiently obtained.

According to an embodiment, the prismatic microprotrusions may be included in an area fraction of 20% or more.

The "rod shape" refers to a figure in the form of a rod consisting of a circular or polygonal base and a lateral face(s) vertically extending from the circular or polygonal base, wherein an angle between a normal vector of the base and a normal vector of the surface of the steel sheet is from 0 to 90°. Representative examples of the "rod shape" may be cylindrical shapes, trigonal prism shapes, and cuboid shapes.

According to an embodiment of the rod-shaped microprotrusions, a height of the lateral face may be 50 nm or more. A greater height of the lateral face is more effective on improving hydrophilicity and conductivity. In consideration of this effect, the height of the lateral face may be 50 nm or more.

According to an embodiment of the rod-shaped microprotrusions, the angle between a normal vector of the base and a normal vector of the surface of the steel sheet may be from 0 to 30°. A smaller angle between the base and the normal vector of the surface of the steel sheet is more effective on improving hydrophilicity and conductivity. In consideration of this effect, the angle between the normal vector of the base and the normal vector of the surface of the steel sheet may be from 0 to 30°.

According to an embodiment, the rod-shaped microprotrusions may be included in an area fraction of 20% or more.

The "needle shape" refers to a three-dimensional figure consisting of curves or straight lines continuously extending in a radial form from one vertex toward the steel sheet, wherein an angle between each of the radially extending curves or straight lines and a normal vector of the surface of the steel sheet is more than 90° but not more than 180°. Representative examples of the "needle shape" may be conical shapes and quadrangular pyramid shapes.

According to an embodiment of the needle-shaped microprotrusions, a vertical distance from a vertex to a surface of the steel sheet may be 50 nm or more. A greater distance from the surface to the vertex increase is more effective on improving hydrophilicity and conductivity. In consideration of this effect, the distance between the surface of the steel sheet and the vertex may be 50 nm or more.

According to an embodiment of the needle-shaped microprotrusions, an angle between a radially extending curve or straight line and a normal vector of the surface of the steel sheet may be from 150 to 180°. A greater angle between each of the radially extending curves or straight lines and a normal vector of the surface of the steel sheet is more effective on improving hydrophilicity and conductivity, and in consideration of this effect, an angle between each of the radially extending curves or straight lines and a normal vector of the surface of the steel sheet may be from 150 to 180°.

According to an embodiment, the needle-shaped microprotrusions may be included in an area fraction of 20% or more.

It is to be noted that the microprotrusions in the joint structure do not necessarily have only one of the prismatic shape, the rod shape, and the needle shape. According to various embodiments, the microprotrusions in the joint structure may include the prismatic microprotrusions alone, the rod-shaped microprotrusions alone, the needle-shaped microprotrusions alone, a mixture of the prismatic microprotrusions and the rod-shaped microprotrusions, a mixture of the prismatic microprotrusions and the needle-shaped microprotrusions, a mixture of the rod-shaped microprotrusions and the needle-shaped microprotrusions, and a mixture of the prismatic microprotrusions, the rod-shaped microprotrusions, and the needle-shaped microprotrusions.

The shape of the joint structure will be described in detail with reference to the drawings for the sake of clear understanding thereof. However, it should be noted that the accompanying drawings are attached for understanding of the present disclosure and the joint structure of the present disclosure is not construed as limited to the drawings unless otherwise stated.

Figure 1:
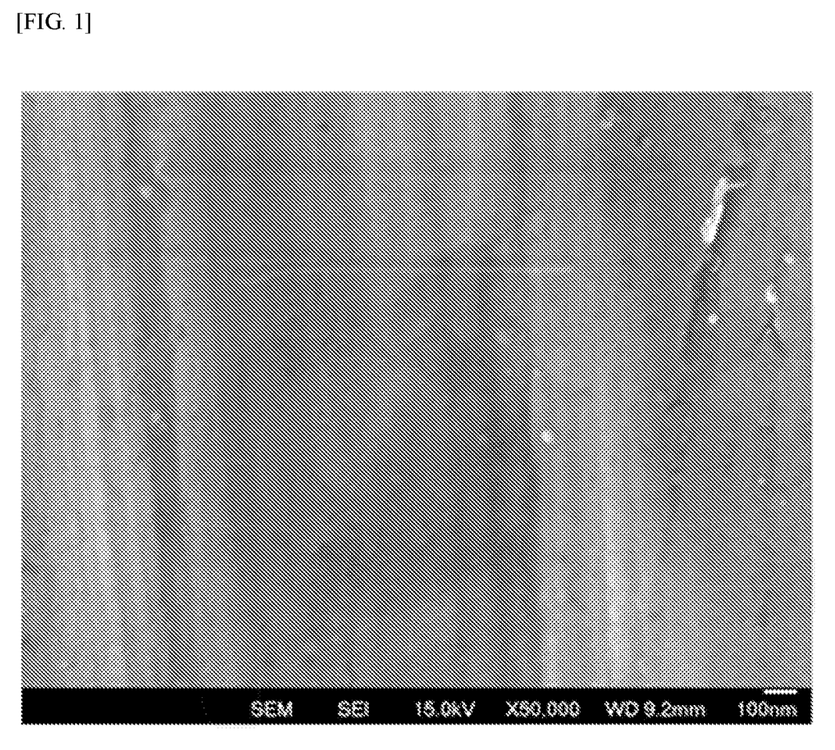
FIG. 1 is an scanning electron microscope (SEM) image of a surface of a conventional steel sheet. (×50,000 magnifications)

FIG. 1 is an scanning electron microscope (SEM) image of a surface of a conventional steel sheet.

Figure 2A:
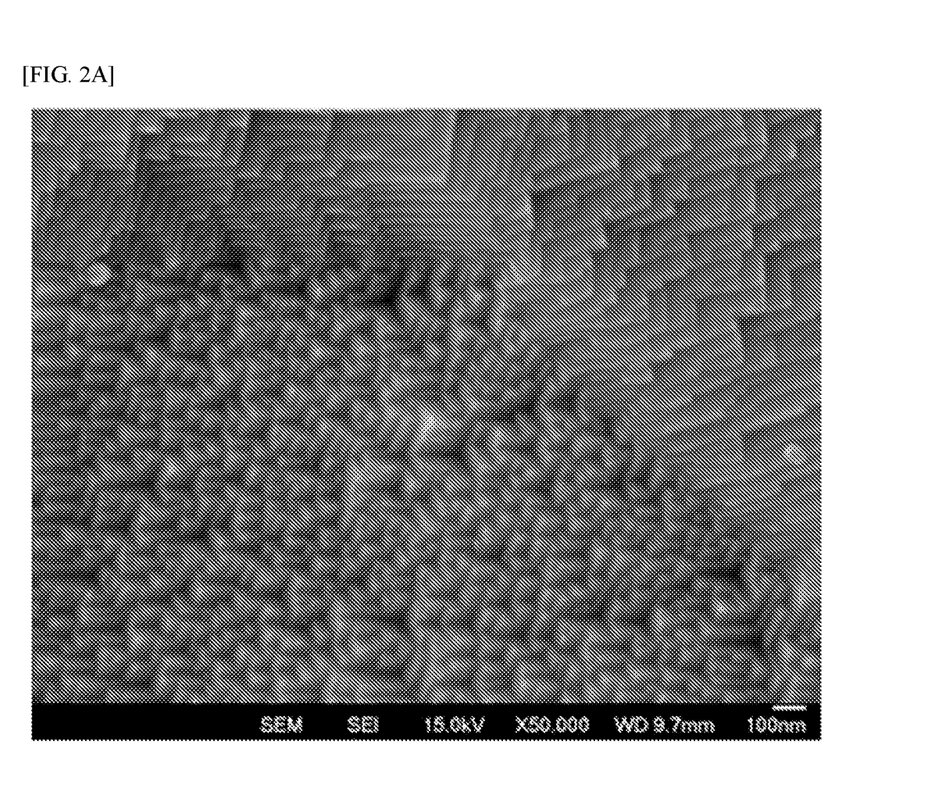
FIGS. 2A and 2B are SEM images of surfaces of steel sheets according to an embodiment of the present disclosure (×50,000 magnifications)
Figure 2B:
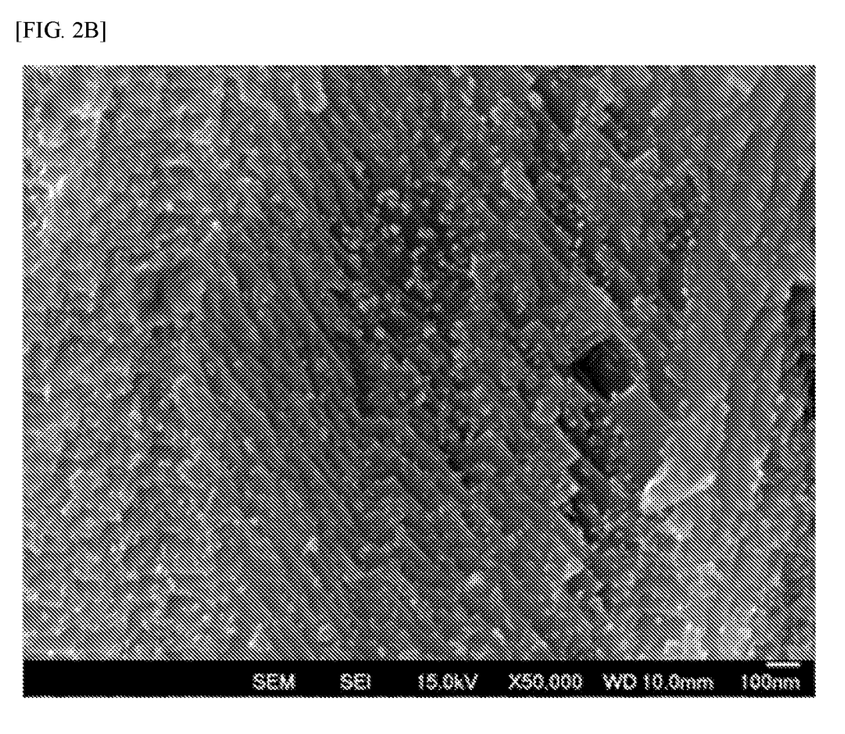

Referring to FIGS. 2A and 2B, a steel sheet according to an embodiment of the present disclosure has a joint structure different from those of conventional steel sheets. Referring to FIG. 2A, two groups of prismatic microprotrusions having different orientations may be distributed. Referring to FIG. 2B, the steel sheet may have a structure in which prismatic microprotrusions and rod-shaped microprotrusions are mixed.

The steel sheet according to an embodiment may include crystal grains with sizes of 1 to 35 μm. In the case where the sizes of the crystal grains are less than 1 μm, surface resistance may be increased due to a decreased contact surface area. On the contrary, in the case where the sizes of the crystal grains exceed 35 μm, surface resistance may be increased due to poor contact.

In the steel sheet according to an embodiment, a height difference between crystal grains may be from 0.1 to 1000 nm. In the case where the height difference between crystal grains is less than 0.1 nm, surface resistance may be increased due to a decreased contact surface area. On the contrary, in the case where the height difference between crystal grains exceeds 1000 nm, surface resistance may be increased due to poor contact.

The steel sheet according to an embodiment including the above-described joint structure has excellent hydrophilicity and conductivity. According to an embodiment, a steel sheet having the joint structure including microprotrusions in an area fraction of 20% or more has a contact resistance of 5 $m\Omega \cdot cm^2$ or less and a contact angle of 80° or less. According to a preferred embodiment, a steel sheet having the joint structure including microprotrusions in an area fraction of 30% or more has a contact resistance of 4 $m\Omega \cdot cm^2$ or less and a contact angle of 60° or less. According to a more preferred embodiment, a steel sheet having the joint structure including microprotrusions in an area fraction of 50% or more has a contact resistance of 3.5 $m\Omega \cdot cm^2$ or less and a contact angle of 50° or less.

As an example of forming the above-described joint structure, high-pressure water sprayed strongly onto a steel material using a scale breaker causes condensation of surface energy of the steel material which induces detachment of metal atoms from the surface where energy is condensed by lattices during a subsequent acid picking process. The surface remained after the metal atoms are detached has inter-pitch intervals of 1 to 500 nm and may have a joint structure in which microprotrusions having one of the prismatic shape, the rod shape, and the needle shape are continuously distributed.

The steel sheet according to the present disclosure including the joint structure have excellent hydrophilicity and conductivity, and a composition of alloying elements thereof to obtain desired hydrophilicity and conductivity which are main properties to be obtained by the present disclosure is not particularly limited. However, a preferred composition is as follows. However, it is necessary to note that the following composition of the alloying elements is only intended to assist understanding of the present disclosure and are not intended to limit the scope of the present disclosure.

The steel sheet according to an embodiment may include, in percent by weight (wt %), more than 0% but not more than 0.02% of C, more than 0% but not more than 0.02% of N, more than 0% but not more than 0.25% of Si, more than 0% but not more than 0.2% of Mn, more than 0% but not more than 0.04% of P, more than 0% but not more than 0.02% of S, 18% to 34% of Cr, and the balance of Fe and other inevitable impurities. Hereinafter, the unit is wt % unless otherwise stated.

C: more than 0% but not more than 0.02%, and N: more than 0% but not more than 0.02%

C and N bind to Cr contained in a steel to form a Cr carbonitride, and thus a region in which Cr is locally depleted may be formed, thereby increasing a risk of deterioration of corrosion resistance. Therefore, it is preferable to control the contents of the two elements as low as possible. Accordingly, the contents of C and N are controlled in the present disclosure such that the C content may be more than 0% but not more than 0.02%, and the N content may be more than 0% but not more than 0.02.

Si: more than 0% but not more than 0.25%

Si is an element effective on deoxidization. However, an excess of Si may deteriorate toughness and formability, and an oxide $SiO_2$ generated during an annealing process deteriorates electrical conductivity and hydrophilicity. In consideration thereof, the Si content is controlled to be more than 0% but not more than 0.25% in the present disclosure.

Mn: more than 0% but not more than 0.2%

Mn is an element effective on deoxidization. However, MnS that is an Mn inclusion reduces corrosion resistance, and thus the Mn content is controlled to be more than 0% but not more than 0.2% in the present disclosure.

P: more than 0% but not more than 0.04%

Because P deteriorates not only corrosion resistance but also toughness, the P content may be controlled to be more than 0% but not more than 0.04% in the present disclosure.

S: more than 0% but not more than 0.02%

S binds to Mn contained in a steel to form stable MnS, and the formed MnS serves as an origin of corrosion to deteriorate corrosion resistance, and thus it is preferable to control the S content as low as possible. In consideration thereof, the S content may be controlled to be more than 0% but not more than 0.02% in the present disclosure.

Cr: 18 to 34%

Cr is an element enhancing corrosion resistance. Cr is actively added to obtain corrosion resistance in a strongly acidic operating environment of a fuel cell. However, an excess of Cr may deteriorate toughness, and thus the Cr content is controlled from 18 to 34% in the present disclosure in consideration thereof.

In addition, the steel sheet according to an embodiment may include as optional alloying elements, if required, in percent by weight (wt %), at least one selected from more than 0% but not more than 0.6% of V, more than 0% but not more than 0.5% of Ti, and more than 0% but not more than 0.5% of Nb in addition to the above-described alloying elements.

V: more than 0% but not more than 0.6%

V is an element enhancing lifespan characteristics of a fuel cell by inhibiting elution of Fe in an operating environment of the fuel cell. However, an excess of V deteriorates toughness, and thus the V content is controlled to be more than 0% but not more than 0.6% in the present disclosure in consideration thereof.

Ti: more than 0% but not more than 0.5%, and Nb: more than 0% but not more than 0.5%

Ti and Nb bind to C and N contained in a steel to form a stable carbonitride and inhibit formation of a region in which Cr is locally depleted, thereby enhancing corrosion resistance. However, an excess of Ti and Nb deteriorates toughness, and thus the Ti content may be controlled to be more than 0% but not more than 0.5% and the Nb content may be controlled to be more than 0% but not more than 0.5% in the present disclosure in consideration thereof.

The remaining component of the composition of the present disclosure is iron (Fe). However, the composition may include unintended impurities inevitably incorporated from raw materials or surrounding environments, and thus addition of other alloy components is not excluded. The impurities are not specifically mentioned in the present disclosure, because they are known to any person skilled in the art of manufacturing.

Hereinafter, the present disclosure will be described in more detail through examples. However, it is necessary to note that the following examples are only intended to illustrate the present disclosure in more detail and are not intended to limit the scope of the present disclosure. This is because the scope of the present disclosure is determined by matters described in the claims and able to be reasonably inferred therefrom.

EXAMPLES

Steel types having various composition ratios of alloying elements were manufactured as slabs and the slabs were hot-rolled at 1200° C. to prepare hot-rolled steel sheets with a thickness of about 4.5 mm. After strongly spraying high-pressure water to the hot-rolled steel sheets using a scale breaker and the steel sheets were acid-pickled. Subsequently, the hot-rolled steel sheets were heated at 1050° C. and cold rolling and annealing at 1000° C. were repeated to prepare cold-rolled steel sheets with a thickness of about 0.15 mm.

Area fractions of the microprotrusions and contact resistances of the prepared cold-rolled steel sheets were measured and shown in Table 1 below.

The area fractions of the microprotrusions shown in Table 1 were measured by using a scanning electron microscope (SEM).

The area fraction of prismatic microscope microprotrusions of Table 1 was obtained by measuring an area of microprotrusions in which three different polygonal faces with the same area or different areas shared one vertex and an angle between normal vectors of the faces was more than 0° but less than 180°, wherein an area of the largest face among three different faces sharing one vertex is less than 40,000 $nm^2$, and a sum of the areas of the three faces was less than 60,000 $nm^2$.

The area fraction of rod-shaped microprotrusions of Table 1 was obtained by measuring an area of microprotrusions in the form of a rod consisting of a circular or polygonal base and a lateral face(s) vertically extending from the circular or polygonal base, wherein an angle between a normal vector of the base and a normal vector of the surface of the steel sheet was from 0 to 90°, and a height of the lateral face was 50 nm or more.

The area fraction of needle-shaped microprotrusions of Table 1 was obtained by measuring an area of microprotrusions as three-dimensional figures consisting of curves or straight lines continuously extending in a radial form from one vertex toward the steel sheet, wherein an angle between each of the radially extending curves or straight lines and a normal vector of the surface of the steel sheet was more than 90° but not more than 180°, and a vertical distance from a vertex to a surface of the steel sheet was 50 nm or more.

Interfacial contact resistance of Table 1 was evaluated by cutting the prepared material into two sheets with an area of 50 $cm^2$, disposing carbon paper (SGL-10BA) used as a gas diffusion layer and having an area of 4 $cm^2$ therebetween, and evaluating interfacial contact resistance under a contact pressure of 100 $N/cm^2$ 5 times, and calculating an average thereof.

Contact angle of Table 1 was evaluated by cutting the prepared steel sheet material to an area of 20 $cm^2$, dropping 3 μl of distilled water onto a surface thereof in the form of droplet at room temperature by using a DSK 10-MK2 device of KRUSS GmbH, and measuring a contact angle with the surface.

TABLE 1

| | Area fraction of microprotrusions (%) | | | | Contact resistance (mΩ·cm²) | Contact angle (°) |
|---|---|---|---|---|---|---|
| | Prismatic microprotrusions | Rod-shaped microprotrusions | Needle-shaped microprotrusions | Sum | | |
| Inventive Example 1 | 15 | 5 | 1 | 21 | 4.9 | 75 |
| Inventive Example 2 | 21 | 2 | 2 | 25 | 4.8 | 70 |
| Inventive Example 3 | 3 | 20 | 1 | 24 | 4.7 | 65 |
| Inventive Example 4 | 0 | 1 | 22 | 23 | 4.6 | 64 |
| Inventive Example 5 | 29 | 4 | 1 | 34 | 3.9 | 55 |
| Inventive Example 6 | 2 | 32 | 12 | 45 | 3.7 | 53 |
| Inventive Example 7 | 22 | 20 | 13 | 55 | 3.4 | 50 |
| Inventive Example 8 | 8 | 24 | 28 | 60 | 3.2 | 49 |
| Inventive Example 9 | 22 | 25 | 24 | 71 | 3.3 | 47 |
| Inventive Example 10 | 23 | 26 | 29 | 78 | 2.9 | 46 |
| Comparative Example 1 | 8 | 5 | 4 | 17 | 6.2 | 87 |
| Comparative Example 2 | 5 | 0 | 0 | 5 | 15.7 | 92 |
| Comparative Example 3 | 1 | 2 | 1 | 4 | 21.1 | 96 |
| Comparative Example 4 | 4 | 8 | 0 | 12 | 18.3 | 88 |

Referring to Table 1, Inventive Examples 1 to 10 satisfying the joint structure provided in the present disclosure had contact resistances not more than 5 mΩ·cm² and contact angles not more than 80° indicating excellent hydrophilicity and conductivity. In addition, the contact resistance tends to increase as the area fraction of the microprotrusions increases. In the inventive examples in which the joint structure included the microprotrusions in an area fraction of 20% or more, contact resistances not more than 5 mΩ·cm² and contact angles not more than 800 were obtained. In the inventive example in which the joint structure included the microprotrusions in an area fraction of 30% or more, contact resistances not more than 4 mΩ·cm² and contact angles not more than 60° were obtained. In the inventive examples in which the joint structure included the microprotrusions in an area fraction of 50% or more, contact resistances not more than 3.5 mΩ·cm² and contact angles not more than 50° were obtained. However, Comparative Examples 1 to 4 did not satisfy the joint structure suggested by the present disclosure, and thus contact resistances exceeded 5 mΩ·cm² and contact angles exceeded 80° indicating poor hydrophilicity and conductivity.

While the present disclosure has been particularly described with reference to exemplary embodiments, it should be understood by those of skilled in the art that various changes in form and details may be made without departing from the spirit and scope of the present disclosure.

INDUSTRIAL APPLICABILITY

Because a steel sheet having excellent hydrophilicity and conductivity and available as a fuel cell separator may be provided by including the joint structure, the present disclosure has industrial applicability.

The invention claimed is:

1. A steel sheet comprising a joint structure on the steel sheet, wherein the joint structure includes microprotrusions with inter-pitch intervals of 1 to 500 nm in an area fraction of 20% or more, wherein among the microprotrusions, prismatic microprotrusions are comprised in an area fraction of 20% or more,
wherein the prismatic microprotrusions are microprotrusions in which three different polygonal faces with the same area or different areas share one vertex, an angle between normal vectors of the faces is more than 0° but less than 180°, and an area of a largest face among the three different faces sharing one vertex is less than 40,000 nm², and a sum of the areas of the three faces is less than 60,000 nm².

2. The steel sheet according to claim 1, wherein crystal grains have a size of 1 to 35 μm.

3. The steel sheet according to claim 1, wherein a height difference between crystal grains is from 0.1 to 1000 nm.

4. A steel sheet comprising a joint structure on the steel sheet, wherein the joint structure includes microprotrusions with inter-pitch intervals of 1 to 500 nm in an area fraction of 20% or more, wherein among the microprotrusions, rod-shaped microprotrusions are comprised in an area fraction of 20% or more,
wherein the rod-shaped microprotrusions are microprotrusions in the form of rods, each including a circular or polygonal base and a lateral face(s) vertically extending from the circular or polygonal base, an angle between a normal vector of the base and a normal vector of a surface of the steel sheet is from 0 to 90°, and a height of the lateral face is 50 nm or more.

5. The steel sheet according to claim 4, wherein the angle between the normal vector of the base and the normal vector of the surface of the steel sheet is from 0 to 30°.

6. The steel sheet according to claim 4, wherein crystal grains have a size of 1 to 35 μm.

7. The steel sheet according to claim 4, wherein a height difference between crystal grains is from 0.1 to 1000 nm.

8. A steel sheet comprising a joint structure on the steel sheet, wherein the joint structure includes microprotrusions with inter-pitch intervals of 1 to 500 nm in an area fraction of 20% or more, wherein among the microprotrusions, needle-shaped microprotrusions are comprised in an area fraction of 20% or more,
   wherein the needle-shaped microprotrusions are three-dimensional figures each including a curve or straight line continuously extending in a radial form from one vertex toward the steel sheet, wherein an angle between the radially extending curve or straight line and a normal vector of a surface of a steel sheet is more than 90° but not more than 180° and a vertical distance from the vertex to the surface of the steel sheet is 50 nm or more.

9. The steel sheet according to claim 8, wherein the angle between the radially extending curve or straight line and the normal vector of the surface of the steel sheet is from 150 to 180°.

10. The steel sheet according to claim 8, wherein crystal grains have a size of 1 to 35 μm.

11. The steel sheet according to claim 8, wherein a height difference between crystal grains is from 0.1 to 1000 nm.

\* \* \* \* \*